(12) United States Patent
Axt et al.

(10) Patent No.: US 12,146,632 B2
(45) Date of Patent: Nov. 19, 2024

(54) EXTERIOR LUMINAIRE FOR A MOTOR VEHICLE

(71) Applicant: Bayerische Motoren Werke Aktiengesellschaft, Munich (DE)

(72) Inventors: Erich Axt, Munich (DE); Abdelmalek Hanafi, Munich (DE); Joerg Kaelble, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/271,492

(22) PCT Filed: Apr. 7, 2022

(86) PCT No.: PCT/EP2022/059264
§ 371 (c)(1),
(2) Date: Jul. 10, 2023

(87) PCT Pub. No.: WO2022/218816
PCT Pub. Date: Oct. 20, 2022

(65) Prior Publication Data
US 2024/0052990 A1 Feb. 15, 2024

(30) Foreign Application Priority Data
Apr. 14, 2021 (DE) .................. 10 2021 109 319.8

(51) Int. Cl.
*F21S 43/237* (2018.01)
*F21S 43/14* (2018.01)
(Continued)

(52) U.S. Cl.
CPC ............ *F21S 43/237* (2018.01); *F21S 43/14* (2018.01); *F21S 43/245* (2018.01); *F21S 43/251* (2018.01); *F21S 43/27* (2018.01)

(58) Field of Classification Search
CPC .......... F21S 43/237; F21S 43/14; F21S 43/27; F21S 43/251; F21S 43/245
See application file for complete search history.

(56) References Cited

U.S. PATENT DOCUMENTS 4,977,487 A * 12/1990 Okano ................... G02B 6/001
    362/555
9,638,389 B2 * 5/2017 Fukui ...................... F21S 43/27
(Continued)

FOREIGN PATENT DOCUMENTS

AT          514405 A1    12/2014
DE    10 2007 036 793 A1    2/2009
(Continued)

OTHER PUBLICATIONS

International Search Report (PCT/ISA/210) issued in PCT Application No. PCT/EP2022/059264 dated Jul. 18, 2022 with English translation (5 pages).
(Continued)

*Primary Examiner* — Matthew J. Peerce
(74) *Attorney, Agent, or Firm* — Crowell & Moring LLP

(57) ABSTRACT

An exterior luminaire for a motor vehicle includes a number of light sources and one or more fiber bundles, each including a number of flexible light-guiding fibers. The exterior luminaire is configured such that, during operation, light originating from the light sources is fed into the fiber bundle(s), as a result of which a respective fiber bundle emits light along its length, the light passing at least partly via a light-transmissive covering sheet into the exterior of the motor vehicle. In the exterior luminaire, a respective fiber bundle is accommodated at least in sections in the longitudinal direction in one or more grooves, a respective groove including at least two joined-together holding components, which form the contour of the respective groove in
(Continued)

cross section and which hold the respective fiber bundle by interlocking engagement and/or force-locking engagement.

17 Claims, 3 Drawing Sheets

(51) Int. Cl.
*F21S 43/245* (2018.01)
*F21S 43/251* (2018.01)
*F21S 43/27* (2018.01)

(56) References Cited

U.S. PATENT DOCUMENTS

| | | | |
|---|---|---|---|
| 9,714,749 | B1 | 7/2017 | Salter et al. |
| 10,429,563 | B2 * | 10/2019 | Akiyama ............... G02B 6/001 |
| 10,576,877 | B2 * | 3/2020 | Moore ................. B60Q 1/2661 |
| 2007/0032319 | A1 | 2/2007 | Tufte |
| 2013/0242603 | A1 | 9/2013 | Pfeil et al. |
| 2015/0369444 | A1 | 12/2015 | Fukui |
| 2023/0091765 | A1 | 3/2023 | Hagl et al. |

FOREIGN PATENT DOCUMENTS

| | | |
|---|---|---|
| DE | 20 2017 102 639 U1 | 7/2017 |
| DE | 10 2016 219 277 A1 | 4/2018 |
| DE | 10 2017 100 754 A1 | 7/2018 |
| DE | 10 2020 102 602 A1 | 8/2021 |
| DE | 10 2020 114 257 A1 | 12/2021 |
| EP | 3 425 266 A1 | 1/2019 |
| JP | 2016-4755 A | 1/2016 |
| JP | 2016-35855 A | 3/2016 |
| WO | WO 2020/074739 A1 | 4/2020 |

OTHER PUBLICATIONS

German-language Written Opinion (PCT/ISA/237) issued in PCT Application No. PCT/EP2022/059264 dated Jul. 18, 2022 (6 pages).

German-language Search Report issued in German Application No. 10 2021 109 319.8 dated Dec. 20, 2021 with partial English translation (15 pages).

* cited by examiner

A-A

B-B

EXTERIOR LUMINAIRE FOR A MOTOR VEHICLE

BACKGROUND AND SUMMARY OF THE INVENTION

The invention relates to an exterior luminaire for a motor vehicle and to a corresponding motor vehicle.

It is known from the prior art to provide light guides as light-emitting elements on the outer side of a motor vehicle. For example, the document U.S. Pat. No. 10,576,877 B2 discloses a light guide which is installed in a radiator grille of a motor vehicle. For fastening in a frame, the light guide has protrusions which are accommodated in depressions of the frame. A special shaping of the light guide for its fastening is therefore required, as a result of which the production costs are increased. Furthermore, fiber bundles made from flexible fibers cannot be used as light guides.

It is the object of the invention to create a simply constructed exterior luminaire for a motor vehicle, the luminaire using a light-conducting structure to emit light.

This object is achieved by the exterior luminaire according to the claimed invention.

The exterior luminaire according to embodiments of the invention is provided for a motor vehicle, preferably for a passenger motor vehicle, but optionally also for a truck. The exterior luminaire is configured for installing on the outer side of the motor vehicle and radiates into the exterior space thereof. If here and below interactions between the exterior luminaire and the motor vehicle or the components thereof are described, this should always be understood to the effect that the interaction occurs when the exterior luminaire is installed in the motor vehicle. The components of the exterior luminaire that have a corresponding interaction with the motor vehicle or components of the motor vehicle are therefore configured in such a manner that the interaction is caused when the exterior luminaire is installed in the motor vehicle.

The exterior luminaire according to embodiments of the invention comprises a number of light sources, i.e. one or more light sources, and one or more fiber bundles which each contain a number of flexible light-conducting fibers. Depending on the design, the individual fibers may be, for example, glass fibers and/or plastic fibers. The term of fiber bundle should be understood broadly, i.e. a fiber bundle can optionally also contain only one individual fiber. In a preferred refinement, however, a plurality of fibers, preferably between 20 and 700 fibers, is provided in a respective fiber bundle. A respective fiber bundle preferably has a round cross section. The diameter of this cross section is preferably between 0.4 mm and 3 mm.

The exterior luminaire is furthermore configured in such a manner that, during the operation thereof, light originating from the number of light sources is fed into the fiber bundle or fiber bundles, as a result of which a respective fiber bundle emits light along its length and preferably along its entire length, the light passing at least partially via a light-transmissive and preferably curved cover lens into the exterior space of the motor vehicle. The cover lens is therefore transmissive to light originating from the fiber bundle or fiber bundles. The cover lens preferably has a transmission degree of 50% or more and in particular of 90% or more. The transmission degree of the cover lens can optionally also be essentially 100%. A respective fiber bundle preferably also emits light along its entire circumference.

In the exterior luminaire according to embodiments of the invention, a respective fiber bundle is accommodated at least in sections in the longitudinal direction in one or more grooves, wherein a respective groove includes at least two joined-together holding components and preferably precisely two joined-together holding components which are part of the exterior luminaire. The contour of the respective groove in cross section is formed by the holding components, i.e. each holding component contains a section which forms part of the contour of the groove in its cross section. The holding components hold the respective fiber bundle by interlocking engagement and/or force-locking engagement. The holding components are preferably provided for fastening the exterior luminaire to the motor vehicle.

Embodiments of invention have the advantage that a fiber bundle can be positioned simply and precisely in a corresponding exterior luminaire by the fiber bundle being held in force-locking or interlocking engagement in a groove which is formed by at least two holding components being joined together.

In a particularly preferred embodiment, the cover lens comprises a region in which, for at least one groove, it engages around the associated two joined-together holding components and presses them against one another by exerting an elastic force. Here and below, the term of the at least one groove should be understood as meaning an individual groove if the exterior luminaire contains just one groove. By contrast, the term of the at least one groove in the event of a plurality of grooves being present includes any desired amount of these grooves (i.e. also just one groove) or optionally also all of these grooves. With the embodiment just described, a simple assembly of the exterior luminaire is achieved, as a result of which its production is simplified.

In a particularly preferred variant of the above embodiment, in the region of the cover lens in which, for at least one groove, it engages around the associated two joined-together holding components, engagement sections are provided on the cover lens, the engagement sections engaging in corresponding engagement sections of the associated at least two holding components. This achieves a particularly good support of the cover lens on the holding components.

In a further preferred refinement, for at least one groove, a positioning device is provided on the associated at least two joined-together holding components, the positioning device predetermining the positioning of the holding components with respect to each other as they are being joined together. For example, the positioning device can comprise one or more positioning pins which are to be inserted into corresponding positioning holes.

The configuration of a respective groove in the exterior luminaire according to embodiments of the invention may be different. In one variant, the cross section of at least one groove is polygonal or C-shaped or U-shaped or in the form of a circular segment.

In a further preferred variant, for at least one groove, the associated at least two joined-together holding components comprise one or more latching elements for fastening (i.e. for latching) to the motor vehicle. This permits a simple mechanical attachment of the exterior luminaire according to embodiments of the invention to the motor vehicle.

In a further preferred embodiment, the contour of at least one groove in cross section comprises two substantially mirror-symmetrical sections, each section belonging to another holding component of the associated at least two joined-together holding components. This ensures a uniform exertion of force on the fiber bundle located in the groove.

In a further refinement, the contour of at least one groove in cross section comprises a depression which is provided in one of the associated at least two joined-together holding components and which is covered by a planar section of the contour of the at least one groove, the planar section being provided in another of the associated at least two joined-together holding components.

In a further preferred embodiment, at least one groove comprises a reflective coating, as a result of which light emission of the exterior luminaire with high luminance can be ensured.

In a further embodiment, for at least one groove, the associated at least two joined-together holding components together form a depression on their side facing away from the cover lens, the depression being provided for engagement of a protrusion when the exterior luminaire is installed in the motor vehicle. This ensures a stable installation of the exterior luminaire in the motor vehicle.

In a further preferred embodiment, for at least one groove, the associated at least two joined-together holding components on their front sides facing the cover lens are spaced apart at least in sections and optionally completely from the cover lens. Alternatively or additionally, it is also possible that, for at least one groove, the associated at least two joined-together holding components lie with their front sides facing the cover lens at least in sections and optionally completely on the cover lens. This ensures a compact construction of the exterior luminaire.

In a further variant of the exterior luminaire according to the invention, for at least one groove, the front sides, facing the cover lens, of the associated at least two joined-together holding components are light-absorbing. By this variant, the light-emitting fiber bundle can be perceived as a fine contour. Nevertheless, it is also possible for the front sides of the holding components to be reflective, as a result of which the luminance of the exterior luminaire is increased.

In a particularly preferred variant, the exterior luminaire is a contour illumination, the one or more fiber bundles of which at least in section follow a predetermined contour on the outer side of the motor vehicle. For example, the exterior luminaire can be a contour illumination for a radiator grille, i.e. the predetermined contour belongs a radiator grille.

In a further preferred variant, the number of light sources comprises one or more laser light sources, preferably one or more laser diodes. The effect which can be achieved with such laser light sources is very high luminance when emitting light via the fiber bundles. Nevertheless, it is also possible for the number of light sources to comprise one or more LEDs.

In addition to the above-descried exterior luminaire, the invention relates to a motor vehicle which contains one or more of the exterior luminaires according to embodiments of the invention or one or more preferred variants of the exterior luminaire according to embodiments of the invention.

An exemplary embodiment of the invention will be described in detail below with reference to the attached figures.

DETAILED DESCRIPTION OF THE DRAWINGS

Figure 1:
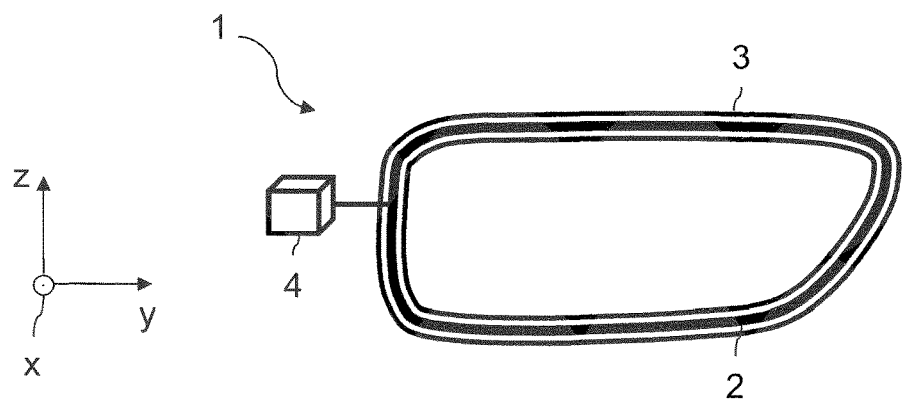
FIG. 1 shows a schematic illustration of an embodiment of an exterior luminaire according to the invention.
Figure 2:
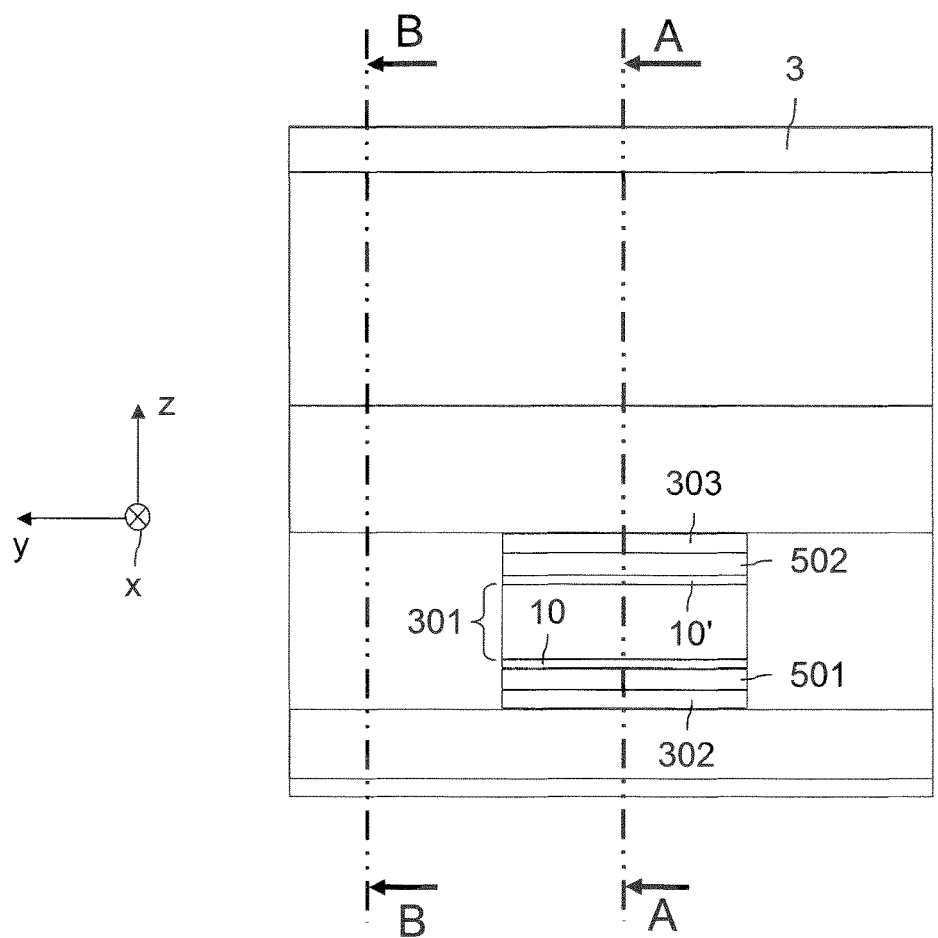
FIG. 2 shows a detailed view of the frame component from FIG. 1 in a top view from the rear in a section in which the exterior luminaire is latched in the frame component.

An embodiment of the invention will be described below with reference to an exterior luminaire in the form of a contour illumination of a motor vehicle radiator grille. Such an exterior luminaire is reproduced in a schematic illustration in FIG. 1 and denoted by reference sign 1. For spatial orientation, a Cartesian coordinate system is illustrated in FIG. 1 and FIG. 2. The x axis of the coordinate system corresponds to the forward direction of travel of the motor vehicle, the y axis to the transverse direction or width direction of the motor vehicle, and the z axis to the vertical direction of the motor vehicle.

The exterior luminaire 1 comprises an assembly 2, not illustrated in detail, which comprises two joined-together holding components, a fiber bundle and a cover lens, these components being shown in FIGS. 3 to 6 and described in more detail further below. In the embodiment of FIG. 1, the assembly 2 is fastened via the holding components in a peripheral frame component 3 of a partial region of a radiator grille in the shape of a kidney. The fiber bundle which runs along the entire frame component is fed via a light source 4, which is only indicated schematically. Accordingly, the fiber bundle emits light along its entire length. The configuration of the exterior luminaire as a peripheral fiber bundle with a single light source is merely by way of example. The fiber bundle can also extend, for example, between two opposite ends which are arranged at different positions on the outer side of the motor vehicle. In this case, a light source feeding in light can be provided only at one end or optionally also a light source feeding in light can be provided at both ends.

To achieve high luminance, it is possible to use as light source 4, for example, a laser light source consisting of one or more laser diodes, which feeds white light and optionally also differently colored light into the fiber bundle. The fiber bundle consists of a plurality of flexible light-conducting fibers and conventionally contains 50 or more of such fibers.

FIG. 2 shows, in a top view from the rear, i.e. in the viewing direction corresponding to the x direction of the coordinate system, a section of the frame component 3 in which the exterior luminaire 1 is latched in the frame component. A plurality of such sections are provided along the circumferential direction of the frame component, and therefore the exterior luminaire is held fixedly in the frame component along the entire circumference thereof. The corresponding section for latching the exterior luminaire comprises a web 301, along the upper side of which an opening 10' is provided and along the lower side of which an opening 10 is provided. These openings can be seen even better from the sectional illustration of FIG. 3. A latching element 501 in the form of an undercut is inserted into the lower opening 10. Analogously, such a latching element 502 is located in the upper opening 10'. A protrusion 302 of the frame component 3, which protrusion engages around the latching element or the undercut 501, is located below the opening 10. In the same way, a protrusion 303 which engages around the latching element or the undercut 502 is provided above the opening 10'.

FIG. 3 shows, once again in a sectional view along the line A-A from FIG. 2, the construction of the assembly 2 and of the frame component 3 in the region of the latching to the frame component. As is seen, the assembly 2 comprises a lower holding component 5 and an upper holding component 5' which are joined together and lie on each other along a horizontally running planar surface. To position the holding components with respect to one another, a positioning pin 9 is provided in the holding component 5, which positioning pin is inserted into a corresponding opening of the holding component 5' when the holding components 5 and 5' are correctly arranged with respect to each other.

Figure 3:
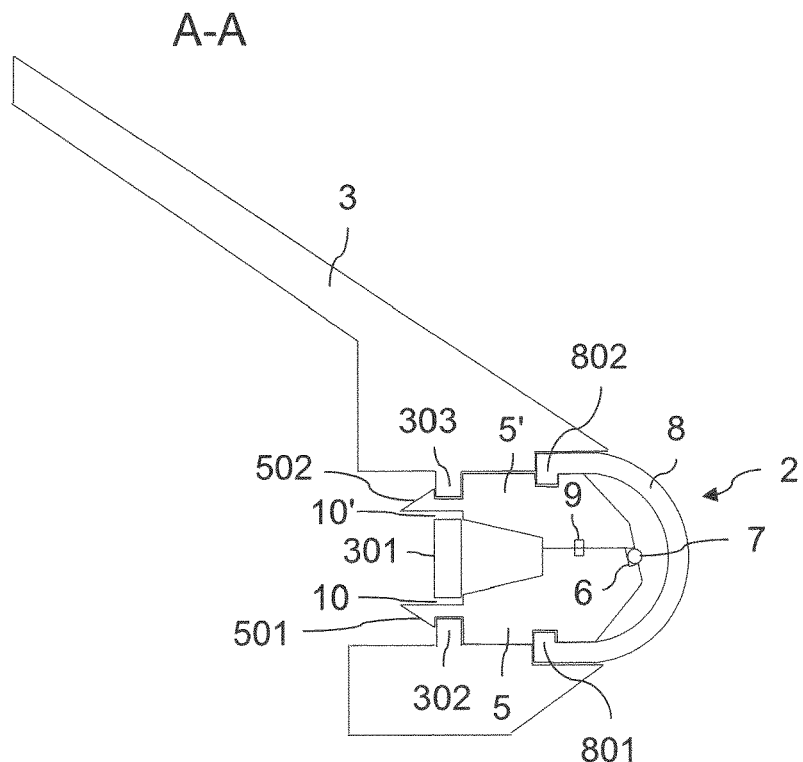
FIG. 3 shows a sectional view along the line A-A of FIG. 2.

The fiber bundle 7 which is held in a corresponding groove 6 by force-locking engagement is located on the right front side of the joined-together holding components 5 and 5'. It is essential to embodiments of the invention here that the groove 6 is formed both by the holding component 5 and by the holding component 5'. In other words, one section of the contour of the groove 6 in cross section belongs to the holding component 5, whereas a different section of the contour of the groove belongs to the holding component 5'. In the embodiment of FIG. 3, that section of the contour which belongs to the holding component 5 is a depression 601, whereas that section of the contour which belongs to the holding component 5' is a planar surface 602 (see FIG. 5). When the light source 4 is activated, the fiber bundle 7 emits light along its entire length and its entire circumference, the light partially emerging via the cover lens 8, described further below, to the outside such that a luminous surface arises along the fiber bundle on the outer side of the motor vehicle.

The front side of the holding components 5, 5' with the fiber bundle 7 provided there is covered by the light-transmissive plastics cover lens 8 which is curved and elastically bendable. In the embodiment of FIG. 3, the cover lens 8 is spaced apart from the front side of the holding components 5, 5'. In a modified embodiment, the cover lens 8 can also lie on the front side of the two holding components 5, 5', as a result of which the exterior luminaire is particularly compact.

The cover lens 8 is configured in a C-shaped manner, with protrusions 801 and 802 being formed at the respective ends of this C shape. The cover lens 8 engages around the two holding components 5, 5', and therefore the two protrusions 801 and 802 engage in corresponding depressions of the respective holding components. The cover lens here exerts an elastic force from above and from below on the holding components such that the holding components are held together via this force. The holding components are therefore mechanically connected to each other in a simple manner, with the support of the fiber bundle 7 in the groove 6 being ensured at the same time.

According to FIG. 3, the latching element 501 already mentioned above is provided at the rear end of the holding component 5. A corresponding latching element 502 is also located at the rear end of the holding component 5'. The latching element 501 is pushed into the lower opening 10 and the latching element 502 into the upper opening 10' such that the undercut of the latching element 501 engages in the protrusion 302 and the undercut of the latching element 502 engages in the protrusion 303. The latching element 501 exerts an elastic force downward the latching element 502 exerts an elastic force upward, and therefore the holding components 5, 5' and therefore the entire assembly 2 are held fixedly in the frame component 3.

Figure 4:
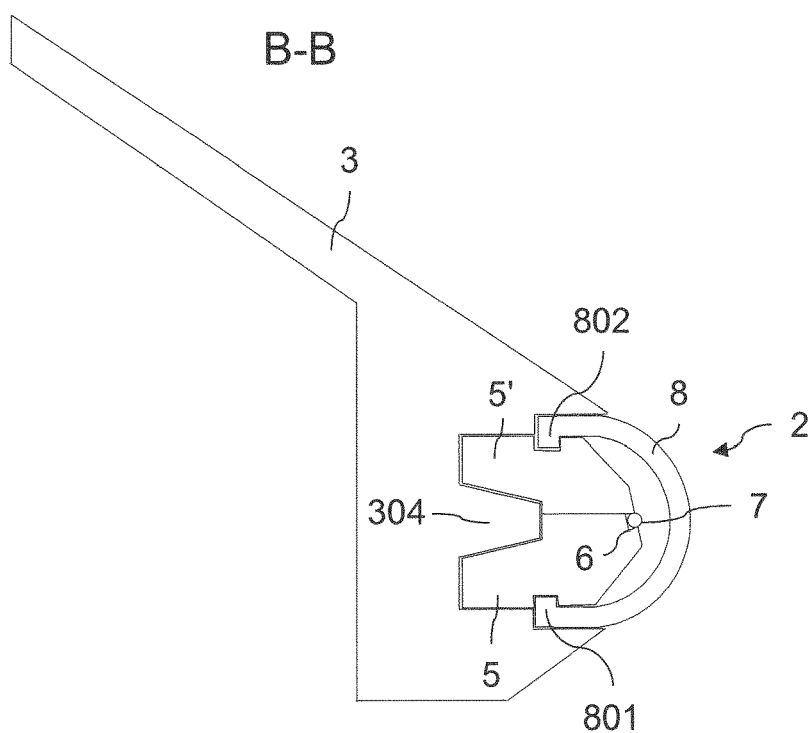
FIG. 4 shows a sectional view along the line B-B of FIG. 2.

FIG. 4 shows a sectional view along the line B-B of FIG. 2 in a region of the frame component 3 in which latching of the assembly 2 is not provided. As is seen from FIG. 4, no openings 10, 10' are provided in this region of the frame component. Instead, a protrusion 304 is formed in the frame component 3, the protrusion extending into corresponding depressions on the rear side of the holding components 5 and 5' and lying there on the holding components. By way of the protrusion 304 in combination with the holding components 5, 5' lying thereon, the stability of the connection between assembly 2 and frame component 3 is improved.

FIG. 5 once again shows an enlarged view of the assembly 2 from FIG. 4. The contour of the groove 6 and the formation thereof by the lower holding component 5 and the upper holding component 5' are visible once again from this figure. In particular, it is seen that the lower holding component 5 has a V-shaped depression 601 into which the fiber bundle 7 is inserted. The depression is covered from above by the holding component 5', with a planar vertical section of the holding component 5' pressing onto the holding component 5. The planar section at the front end of the holding component 5' is denoted by reference sign 602 and forms a planar section of the groove 6. With this configuration of the groove, a simple assembly of the assembly 2 is ensured by the fiber bundle 7 being inserted into the depression 601 and then the holding component 5' being placed onto the holding component 5 with the aid of the positioning pin 9. Subsequently, the curved cover lens 8 can be pushed onto the holding components 5, 5' such that the protrusions 801 and 802 engage in the corresponding depressions of the holding components and the holding components are held together.

Figure 5:
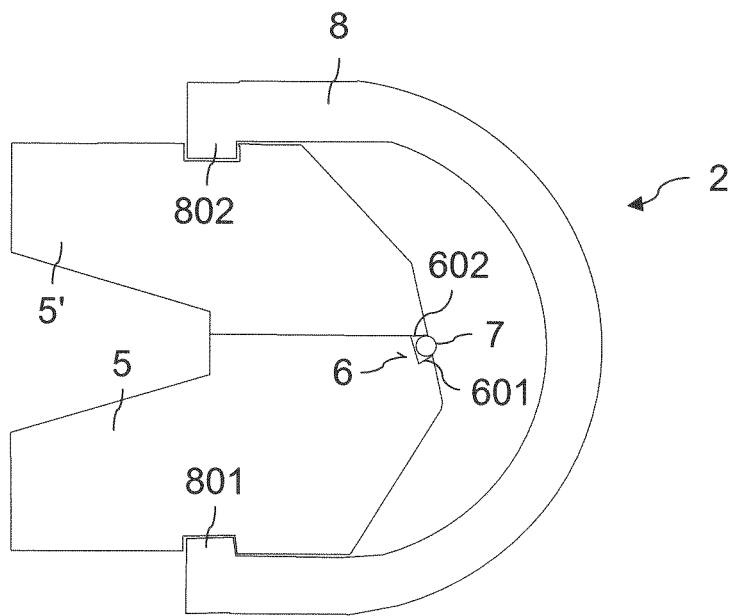
FIG. 5 shows an enlarged sectional view of the exterior luminaire from FIG. 4 without a frame component.
Figure 6:
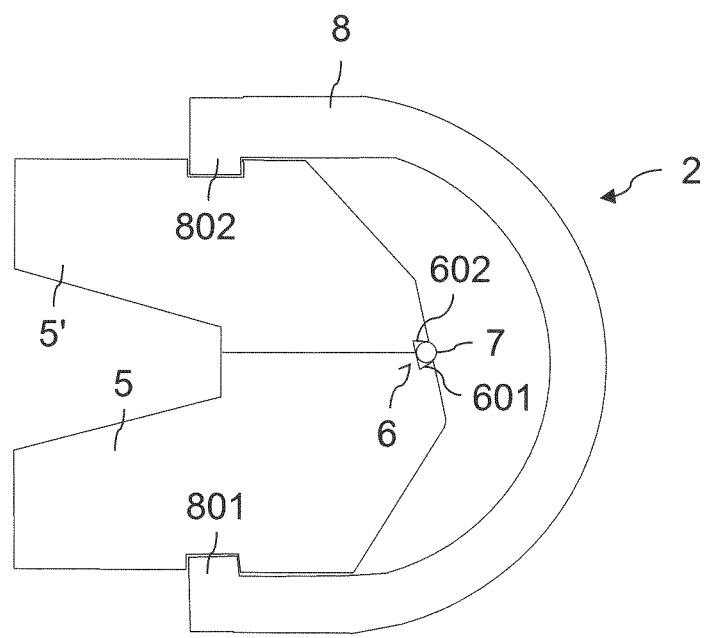
FIG. 6 shows a view analogously to FIG. 5 of a modified embodiment of the exterior luminaire.

FIG. 6 shows a modification of the assembly 2 from FIG. 5. The sole difference between FIG. 5 and FIG. 6 consists in the design of the groove. In the variant of FIG. 6, the groove is formed from two mirror-symmetrical depressions 601 and 602 between which the corresponding fiber bundle 7 is located. The groove can optionally also have any other shape. All that is essential to embodiments of the invention is that the groove is formed both by the holding component 5 and by the holding component 5', i.e. the contour of the groove contains sections of both holding components. For example, the groove can also be shaped in a C-shaped manner or U-shaped manner or in the form of a circular segment. In order to achieve good light emission of the fiber bundle, the groove is preferably provided with a reflective coating. The rest of the front side of the holding components can be light-absorbing or else reflective depending on the configuration.

The previously described embodiments of the invention have a series of advantages. In particular, a simply constructed motor vehicle exterior luminaire is created in which a light-emitting fiber bundle is held precisely in a groove which is formed by two holding components. The exterior luminaire has compact dimensions and can be fastened in a simple manner to the motor vehicle by latching.

LIST OF REFERENCE SIGNS

1 Exterior luminaire
2 Assembly consisting of holder, fiber bundle and cover lens
3 Frame component
301 Web on the frame component
302, 303, 303 Protrusions of the frame component
4 Light source
5, 5' Holding components
501, 502 Latching element 5 Groove
601, 602 Sections of the groove
7 Fiber bundle
8 Cover lens
801, 802 Protrusions of the cover lens
9 Positioning pin
10, 10' Openings

The invention claimed is:

1. An exterior luminaire for a motor vehicle, the exterior luminaire comprising:
a plurality of light sources; and
one or more fiber bundles, each of which comprises a plurality of flexible light-conducting fibers, wherein:
the exterior luminaire is configured such that, during operation, light originating from the plurality of light sources is fed into the one or more fiber bundles, as a result of which a respective fiber bundle emits light along its length, the light passing at least partially via a light-transmissive cover lens into an exterior space of the motor vehicle,
the respective fiber bundle is accommodated at least in sections in a longitudinal direction in one or more grooves, wherein a respective groove includes at least two joined-together holding components by which a contour of the respective groove in cross section is formed and which hold the respective fiber bundle by at least one of interlocking engagement or force-locking engagement,
the cover lens comprises a region in which, for at least one groove, the cover lens engages around the associated at least two joined-together holding components and presses the associated at least two joined-together holding components against one another by exerting an elastic force, and
in the region of the cover lens, engagement sections are provided on the cover lens, the engagement sections engaging in corresponding engagement sections of the at least two joined-together holding components.

2. The exterior luminaire according to claim 1, wherein at least one of the respective fiber bundle comprises a plurality of fibers, or the respective fiber bundle has a round cross section.

3. The exterior luminaire according to claim 2, wherein the respective fiber bundle comprises between 50 and 700 fibers.

4. The exterior luminaire according to claim 2, wherein a diameter of the round cross section is between 0.4 mm and 3 mm.

5. The exterior luminaire according to claim 1, wherein, for at least one groove, a positioning device is provided on the associated at least two joined-together holding components, the positioning device predetermining the positioning of the holding components with respect to each other as they are being joined together.

6. The exterior luminaire according to claim 1, wherein a cross section of at least one groove is polygonal, C-shaped, U-shaped, or in a form of a circular segment.

7. The exterior luminaire according to claim 1, wherein, for at least one groove, the associated at least two joined-together holding components comprise one or more latching elements for fastening the exterior luminaire to the motor vehicle.

8. The exterior luminaire according to claim 1, wherein a contour of at least one groove in cross section comprises two substantially mirror-symmetrical sections, each section belonging to a different holding component of the associated at least two joined-together holding components.

9. The exterior luminaire according to claim 1, wherein a contour of at least one groove in cross section comprises a depression which is provided in one of the associated at least two joined-together holding components and which is covered by a planar section of the contour of the at least one groove, the planar section being provided in another of the associated at least two joined-together holding components.

10. The exterior luminaire according to claim 1, wherein at least one groove comprises a reflective coating.

11. The exterior luminaire according to claim 1, wherein, for at least one groove, the associated at least two joined-together holding components together form a depression on their side facing away from the cover lens, the depression being provided for engagement of a protrusion when the exterior luminaire is installed in the motor vehicle.

12. The exterior luminaire according to claim 1, wherein at least one of:
for at least one groove, the associated at least two joined-together holding components on their front sides facing the cover lens are spaced apart at least in sections from the cover lens,
for at least one groove, the associated at least two joined-together holding components lie with their front sides facing the cover lens at least in sections on the cover lens, or
for at least one groove, front sides facing the cover lens of the associated at least two joined-together holding components are light-absorbing or reflective.

13. The exterior luminaire according to claim 1, wherein the exterior luminaire is a contour illumination, and the one or more fiber bundles at least in sections follow a predetermined contour on an outer side of the motor vehicle.

14. The exterior luminaire according to claim 13, wherein the predetermined contour belongs to a radiator grille.

15. The exterior luminaire according to claim 1, wherein the plurality of light sources comprises one or more laser light sources.

16. The exterior luminaire according to claim 15, wherein the plurality of light sources comprises at least one of one or more laser diodes or one or more LEDs.

17. A motor vehicle comprising the exterior luminaire according to claim 1.

* * * * *